April 17, 1928.
E. A. COPELAND
1,666,168
SKATE ROLLER
Filed June 6, 1927
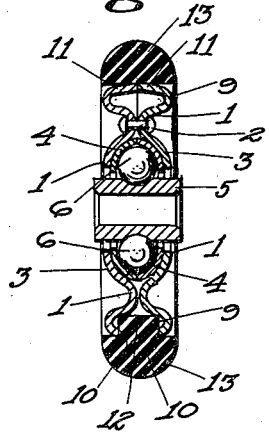
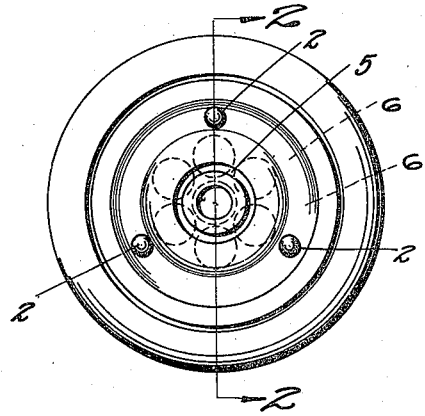
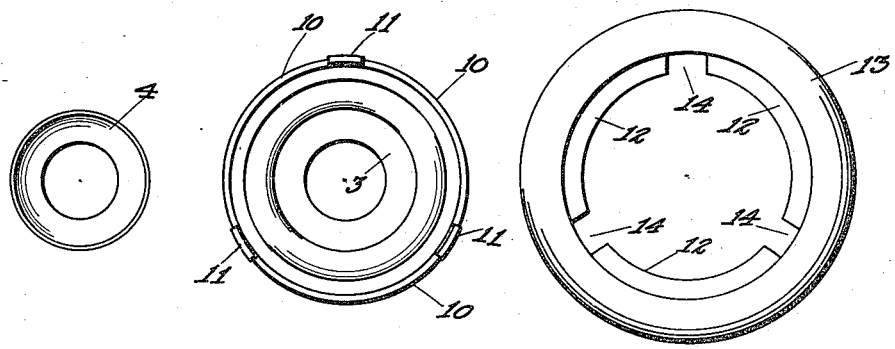
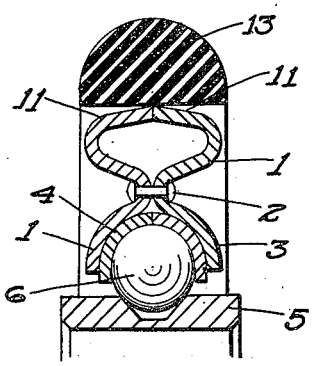
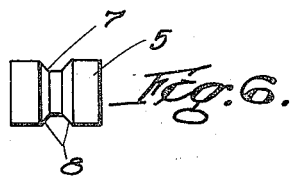
Inventor:
Eugene A. Copeland
By Geo. H. Kennedy Jr.
Attorney Patented Apr. 17, 1928.

1,666,168

UNITED STATES PATENT OFFICE.

EUGENE A. COPELAND, OF WORCESTER, MASSACHUSETTS, ASSIGNOR TO THE SAMUEL WINSLOW SKATE MANUFACTURING COMPANY, OF WORCESTER, MASSACHUSETTS, A CORPORATION OF MASSACHUSETTS.

SKATE ROLLER.

Application filed June 6, 1927. Serial No. 196,915.

The invention relates to rollers, particularly those used as the wheels of skates, and contemplates a simple assemblage of sheet metal stampings, providing a ball bearing, and adapted to hold a rubber or fibre tread, which minimizes noise and absorbs shocks.

One of the objects of the invention is the attainment of an extremely rigid structure, in an article of this class, so that there may be no distortion of the parts while the article is in use. This object is attained by the employment of two side plates, directly fastened together, that hold the tread and that also hold one of the races of the ball bearing. By thus eliminating separate tread-holding rims, the strength of the article is much increased.

A further object of the invention is to entirely eliminate any contact between the stationary and the moving parts, with consequent friction and wear. To this end a substantial clearance is provided between the side plates and the stationary bearing support and the ball race elements are caused to contact the spherical balls at widely divergent points so that the rollers may resist axial distortion.

A still further object of the invention is the attainment of the above advantageous features in a roller that can be manufactured cheaply. Other objects and advantages will appear in the following detailed description taken in connection with the accompanying drawings, in which—

Fig. 1 is a side elevation of the roller of the invention.

Fig. 2 is a diametral sectional view of the said roller, the section being taken on the line 2—2 of Fig. 1.

Fig. 3 is a side elevation of the tread or tire of the roller.

Fig. 4 is an elevation of one of the side plates constituting part of the roller, showing that side of the plate which faces inwardly.

Fig. 5 is a similar view of one of the outer ball parts.

Fig. 6 is a side elevation of a bushing forming the inner ball race.

Fig. 7 is a fragmentary sectional view of the roller shown on an enlarged scale.

Like reference characters refer to like parts in the different figures.

Referring first to Fig. 2, the body of the roller comprises side plates 1, 1, which in the assembled article are directly attached together as by rivets 2. The two side plates are identical and they provide curved annular portions 3 which support outer annular ball races 4, 4 that have the form of circular quadrants in cross section. Between the latter and a stationary bushing 5 are the bearing balls 6, which contact the outer races 4, 4 substantially midway of the quadrants and which contact the bushing 5 on the opposite sides of a groove 7 formed therein. The groove 7 provides steep flat sides 8, 8 (see Fig. 6) in order that the points of contact of the balls 6 with said groove may be well separated. This feature, as aforesaid, gives the roller great resistance to any force tending to distort the roller from a plane at right angles to its axial support.

The side plates 1 are curved outwardly at 9 and terminate in inwardly recurved portions 10. The portions 10 extend the greater part of the circumference of each side plate, but are broken in continuity by a plurality of inwardly extending lugs 11. Compare Figs. 2 and 4. The surfaces of the recurving portions 10 on the two side plates are, when the article is assembled, separated by a considerable distance, as can be readily seen from Figs. 2 and 7. Between said surfaces inwardly extending portions 12 of a tire 13 are firmly clamped. As the side plates are rigidly fastened together by the rivets 2, the tire 13 is thus firmly held against any lateral movement. To hold the tire firmly from radial movement and from relative rotation in respect to the plates 1, a series of slots 14 separating the portions 12 are provided, the lugs 11 fitting with a close fit into said slots.

It will be noted that all the parts of the roller can be manufactured cheaply. The outer races 4 (see Fig. 5) are metal stampings as are likewise the side plates 1. The bushing 5 can be made in a screw machine and the tire 13 can be molded. It should be further noted that the side plates 1 are directly fastened together by the rivets 2 and that they serve to hold all the other parts of the article; by this construction the development of play between the parts is prevented. And as already stated, no moving part touches the bushing 5, yet the roller can resist any side pressure that is likely to be encountered in its use on a skate. This resistance to side pressure is derived from the wide angular separation of the points of contact on the bearing balls, and also because of the fact that the holding rivets 2 are located as close to the balls 6 as it is possible to place them, thus reducing the leverage which the side pressure exerts against them.

I claim,

A skate roller comprising a pair of annular side plates assembled in opposed relation to make a substantial contact with each other on a circle intermediate their inner and outer peripheries, fastening means to hold said plates together, on said intermediate circle of contact, said plates, both inwardly and outwardly of said circle of contact, being laterally flared, a pair of cooperating ball race sections disposed within said inner lateral flaring portions of said plates, balls in said race sections, a hub with a peripheral groove which provides the inner raceway for said balls, and a circular tread member interposed between the outer lateral flaring portions of said side plates, the latter having spaced lugs to fit in slots provided by said tread member.

Dated June 2, 1927.

EUGENE A. COPELAND.